(12) United States Patent
Moradnia

(10) Patent No.: US 11,891,942 B1
(45) Date of Patent: Feb. 6, 2024

(54) VEHICLE COOLING SYSTEM WITH RADIAL OR MIXED AIR FLOW

(71) Applicant: Honda Motor Co., Ltd., Tokyo (JP)

(72) Inventor: Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/898,651

(22) Filed: Aug. 30, 2022

(51) Int. Cl.
| *F01P 11/10* | (2006.01) |
| *B60H 1/00* | (2006.01) |
| *F01P 5/06* | (2006.01) |
| *B60H 1/32* | (2006.01) |
| *B60K 1/00* | (2006.01) |

(52) U.S. Cl.
CPC .......... *F01P 11/10* (2013.01); *B60H 1/00385* (2013.01); *B60H 1/3227* (2013.01); *F01P 5/06* (2013.01); *B60K 2001/003* (2013.01)

(58) Field of Classification Search
CPC ....................................................... F01P 11/10
See application file for complete search history.

(56) References Cited

U.S. PATENT DOCUMENTS

| 3,903,960 | A | | 9/1975 | Beck et al. |
| 4,184,541 | A | | 1/1980 | Beck et al. |
| 5,078,206 | A | * | 1/1992 | Goetz, Jr. ................. F28F 1/02 165/44 |
| 5,172,752 | A | * | 12/1992 | Goetz, Jr. ........... F28D 1/05383 165/41 |
| 5,971,709 | A | | 10/1999 | Hauser |
| 6,579,063 | B2 | | 6/2003 | Stairs et al. |
| 7,546,867 | B2 | | 6/2009 | Naukkarinen et al. |
| 8,714,921 | B2 | | 5/2014 | Tembreull et al. |
| 9,903,387 | B2 | * | 2/2018 | Stagg ..................... F04D 29/164 |
| 9,932,990 | B2 | | 4/2018 | Schone et al. |
| 10,107,556 | B2 | | 10/2018 | Buckrell et al. |
| 2003/0070788 | A1 | * | 4/2003 | Dierbeck ............. F28D 1/05366 165/41 |
| 2006/0231242 | A1 | * | 10/2006 | Hawranek ................. F28F 1/22 165/157 |
| 2011/0103011 | A1 | * | 5/2011 | Koplow ............. H05K 7/20163 165/185 |
| 2015/0204615 | A1 | * | 7/2015 | Stafford .................. B23P 15/26 29/890.035 |
| 2016/0153342 | A1 | * | 6/2016 | Biddulph ................ F02B 61/04 29/890.03 |
| 2020/0182547 | A1 | * | 6/2020 | Glickman ............... F28F 9/013 |

FOREIGN PATENT DOCUMENTS

| DE | 102006039007 | 2/2008 |
| DE | 102018216672 | 4/2020 |
| FR | 2506443 | 4/1983 |

* cited by examiner

*Primary Examiner* — Long T Tran
(74) *Attorney, Agent, or Firm* — Plumsea Law Group, LLC

(57) ABSTRACT

A cooling system for a vehicle includes a fan rotor having a conical shape and a plurality of fan blades and a heat exchanger having a conical shape. The fan rotor is configured to discharge air in a predetermined direction which includes an axial direction component and a radial direction component. In a further aspect, a vehicle cooling system includes a fan rotor including a plurality of fan blades; and a heat exchanger having a cylindrical shape. The fan rotor is configured to discharge air in only a radial direction.

18 Claims, 9 Drawing Sheets

VEHICLE COOLING SYSTEM WITH RADIAL OR MIXED AIR FLOW

BACKGROUND

1. Field of the Disclosure

The present disclosure relates to a cooling system for a vehicle and, more particularly, to a cooling system having radial or mixed radial and axial air flow across a heat exchanger.

2. Description of Related Art

A conventional cooling system for a vehicle includes a rectangular shaped heat exchanger and an axial fan having a circular configuration. The axial fan directs air flow in a direction parallel to the axis of the fan in a generally front to back direction relative to the vehicle. Axial fans are well known in the art and the construction thereof is relatively simple and inexpensive. However, with this arrangement, the axial fan only sweeps a portion of the rectangular shaped heat exchanger surface and a substantial area of the heat exchanger is left unswept/uncovered by the axial fan. The axial fan in a conventional cooling package thus does not completely utilize the available area of the heat exchanger for maximum cooling efficiency.

There is a need in the art for a system having a cooling fan to sweep substantially an entirety of the surface area of a heat exchanger in a vehicle cooling system.

SUMMARY

Conventional cooling packages generally have a rectangular heat exchanger and one or more circular fans that sweep only portions of the heat exchangers. That is, axial air flow from the circular fans does not reach to the corners of the rectangular heat exchanger. Moreover, the circular fans may require a large opening to be formed in the front of the vehicle in order to obtain sufficient airflow. The vehicle cooling system according to the disclosure herein includes a fan providing a mixed air flow, i.e., air flow having both a radial component outward and an axial component rearward, and a conical shaped heat exchanger. With this arrangement, the outlet airflow from the fan covers substantially the entire surface of the conical shaped heat exchanger to provide better cooling efficiency and performance.

In one aspect, the disclosure provides a cooling system for a vehicle comprising a fan rotor having a conical shape and a plurality of fan blades; and a heat exchanger having a conical shape. The fan rotor is configured to discharge air in a predetermined direction including an axial component and a radial component.

In another aspect, the disclosure provides a vehicle cooling system comprising a fan rotor including a plurality of fan blades; and a heat exchanger having a cylindrical shape. The fan rotor is configured to discharge air in only a radial direction.

A system and method for cooling a plurality of systems in a vehicle. The cooling system comprises a conical shaped heat exchanger including a plurality of annular cooling tubes. The plurality of annular cooling tubes includes at least one first cooling tube having a first annulus diameter and at least one second cooling tube having a second annulus diameter, the first annulus diameter being larger than the second annulus diameter. The at least one first cooling tube is configured for cooling a first system of the vehicle and the at least one second cooling tube is configured for cooling a second system of the vehicle, the first vehicle system being different from the second vehicle system.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
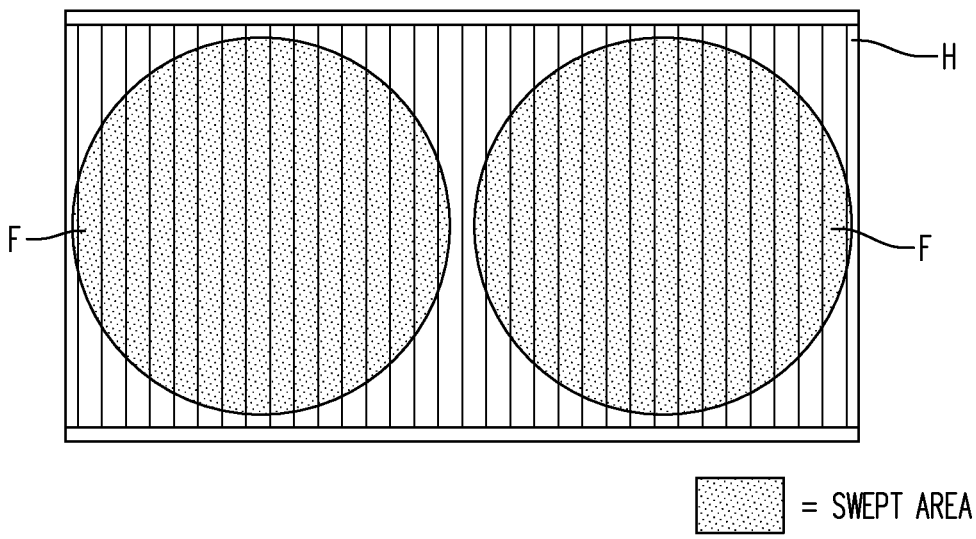
FIG. 1 is a schematic illustration of the air flow area in a conventional cooling system.
Figure 2:
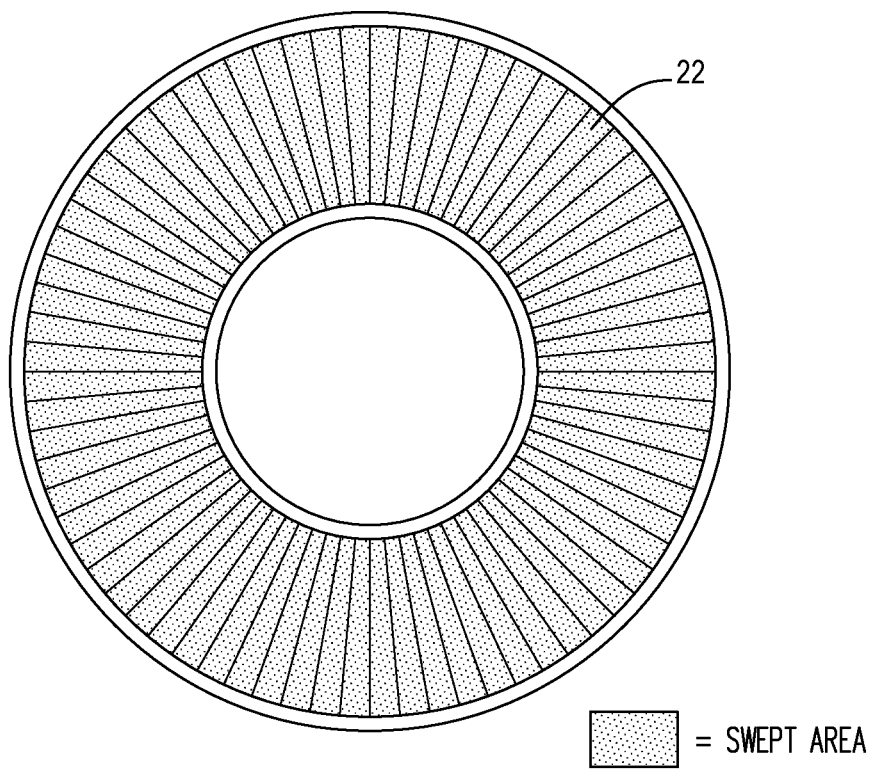
FIG. 2 is a schematic illustration of the air flow area in a cooling system according an exemplary embodiment of the disclosure.
Figure 3:
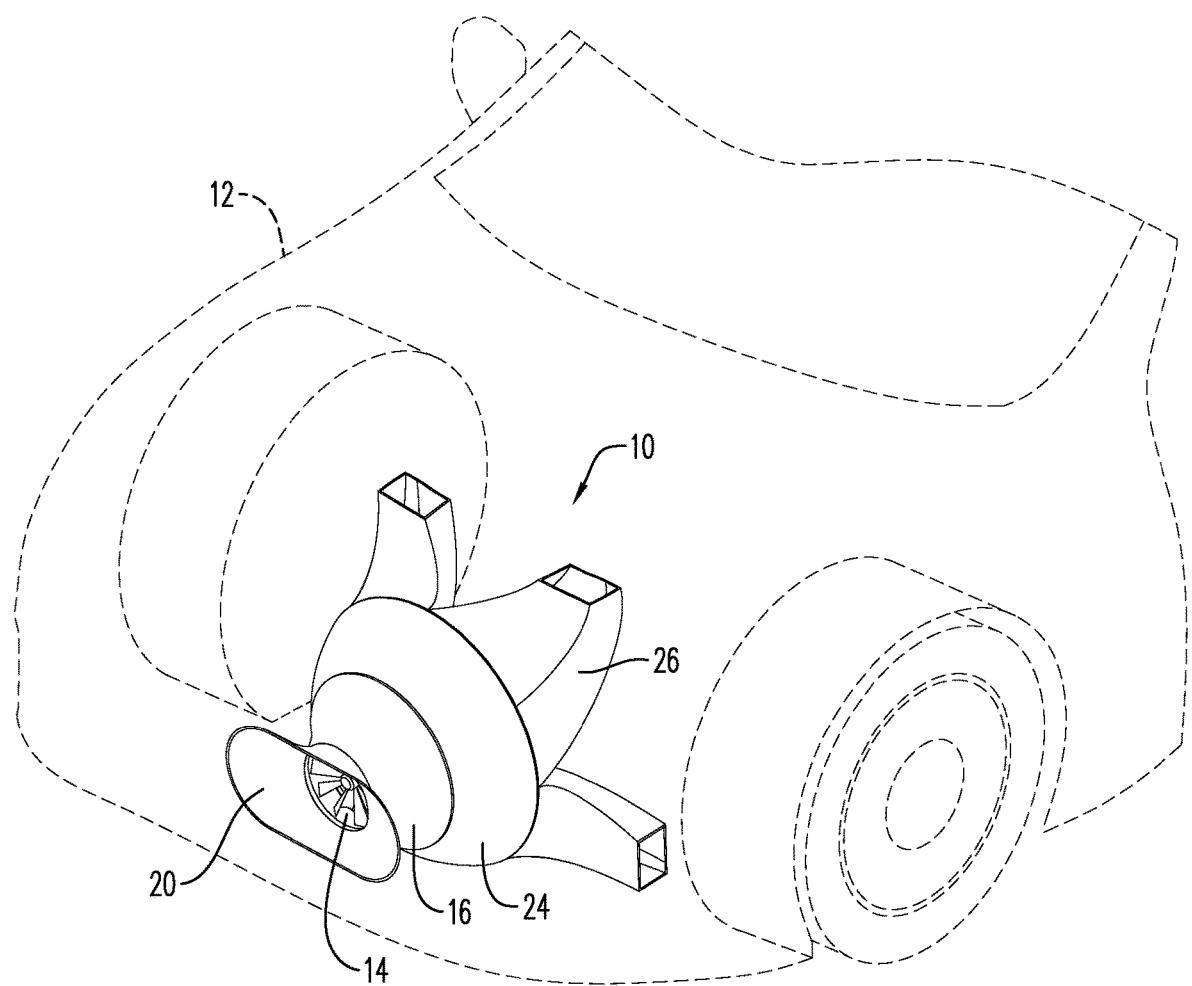
FIG. 3 is a front perspective view of a cooling system for a vehicle according to an exemplary embodiment of the disclosure.
Figure 4:
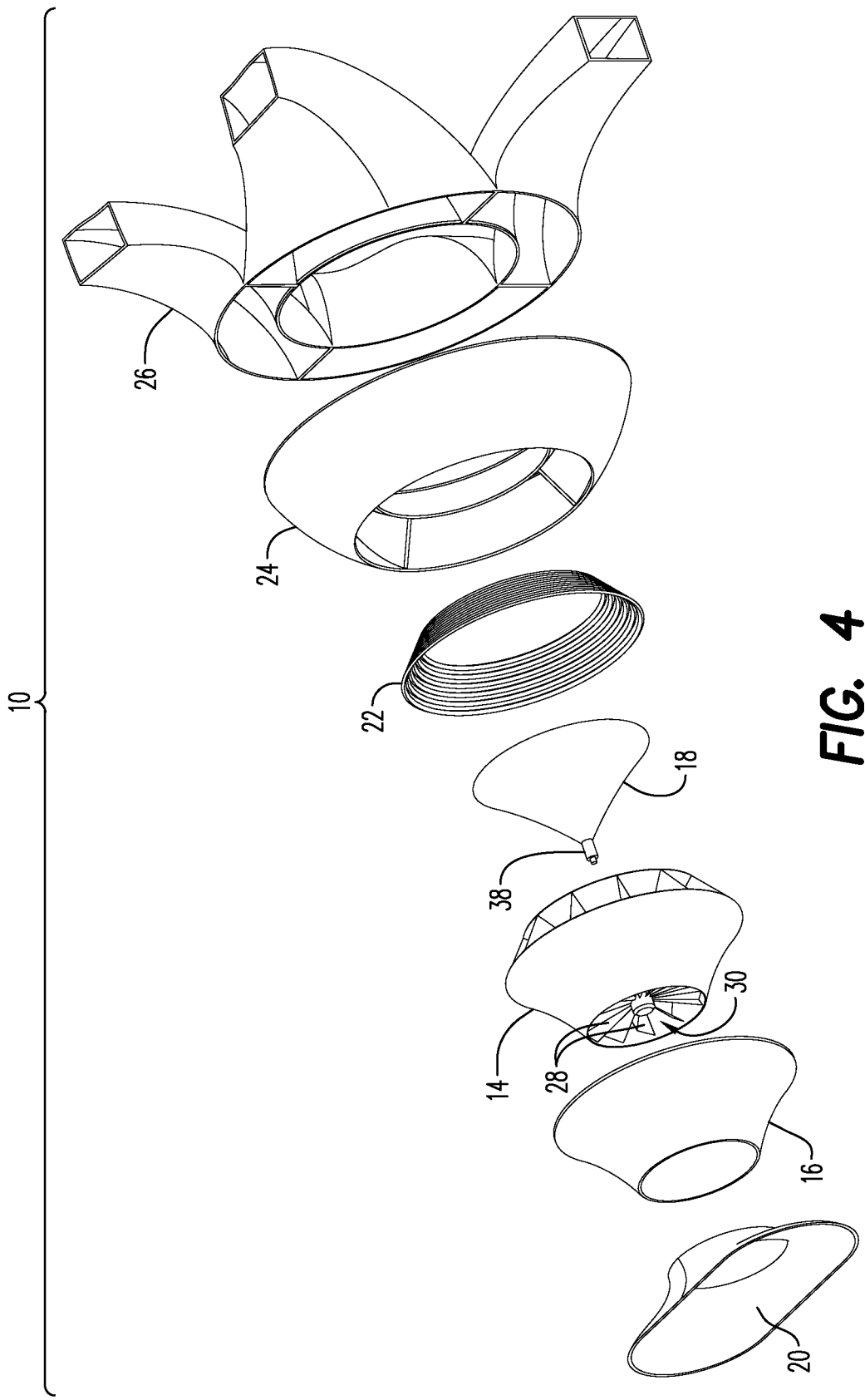
FIG. 4 is a front exploded view of the cooling system shown in FIG. 3.
Figure 5:
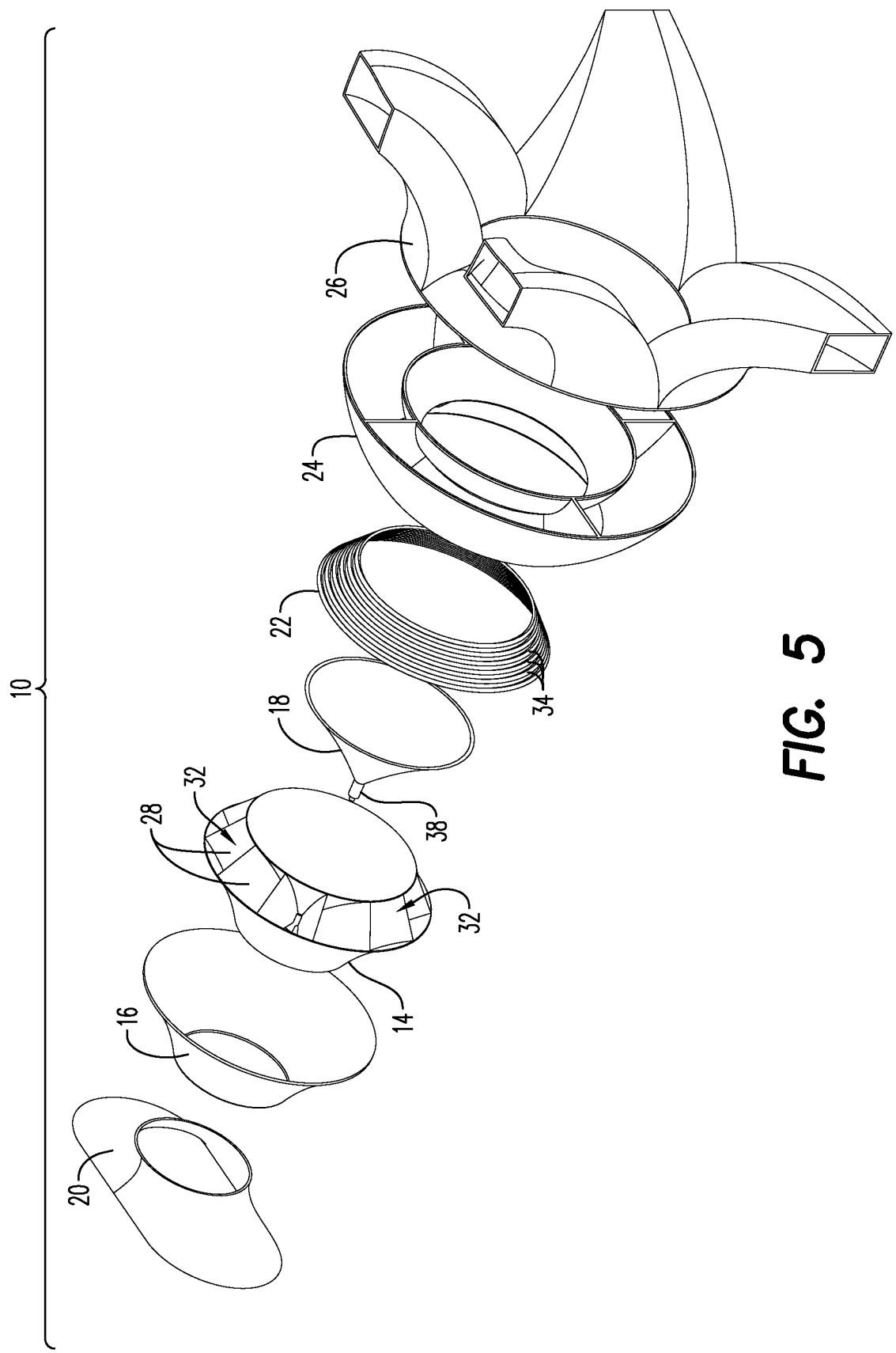
FIG. 5 is a rear exploded view of the cooling system shown in FIG. 3.

With reference to FIG. 1, conventional cooling packages in a vehicle generally include a rectangular heat exchanger H and one or more axial fans that sweep only portions F of the heat exchangers. FIG. 1 schematically illustrates that axial air flow from the fans does not reach to the corners of the heat exchanger. As such, a large area of the heat exchanger H is left unswept or uncovered by air flow from the fan in such a traditional cooling package layout. Moreover, the axial fans may require a large opening to be formed in the front of the vehicle in order to obtain sufficient airflow, which may be detrimental from an aesthetic view. An exemplary embodiment of the disclosure herein is related to a radial or a "mixed" cooling system. As shown in FIGS. 3-5, the vehicle cooling system 10 includes a fan rotor 14 providing a radial air flow outlet or a mixed air flow outlet, i.e., air flow has both a radial component outward and an axial component rearward, and a conical shaped heat exchanger 22. Thus, as schematically illustrated in FIG. 2, the outlet airflow from the fan 14 covers substantially the entire surface of the conical shaped heat exchanger 22.

Air enters the cooling system 10 through an air guide inlet 20 disposed on the front end of the vehicle 12. The air inlet 20 is compact so as to require less space on the front of the vehicle and thereby not hinder the desired aesthetic styling. The air flow passes through the fan rotor 14 having a plurality of fan blades 28. The fan blades 28 may be disposed purely radially, or with a pitch forward or backward to provide a mix of both radial and axial outlet air flow, depending upon the particular application. The fan blades 28 may be planar and have a uniform cross-sectional thickness or a variable thickness, such as found with an air foil blade. The fan blades 28 can sweep inwards, outwards, backwards, or forward, and they can also be twisted or straight depending upon the application. The fan rotor 14 is disposed between an outer fan casing 16 and an inner fan casing 18 and is mounted for rotation on an axial shaft 38. Air flow thus enters the fan 14 through a plurality of fan inlet openings 30 defined between the blades 28 on the leading or front side of the fan 14 and air exits the fan 14 through a plurality of fan outlet openings 32 defined between the blades 28 on the trailing or rear side of the fan 14.

Air flow $A_{in}$ entering the fan 14 from the air guide inlet 20 flows in an axial direction generally parallel to the shaft 38 of the fan 14. However, due to the configuration of the fan blades 28, the cooling air flow $A_{out}$ exiting the fan 14 flows in a radial direction outward or in both a rearward and outward direction such that the air flow direction includes both an axial component along the x-axis and a radial component along the y-axis, as shown best in FIGS. 8 and 9. The angle of the air flow $A_{out}$ can of course change to have either a greater radial or a greater axial component, or only a radial air flow out.

Figure 9:
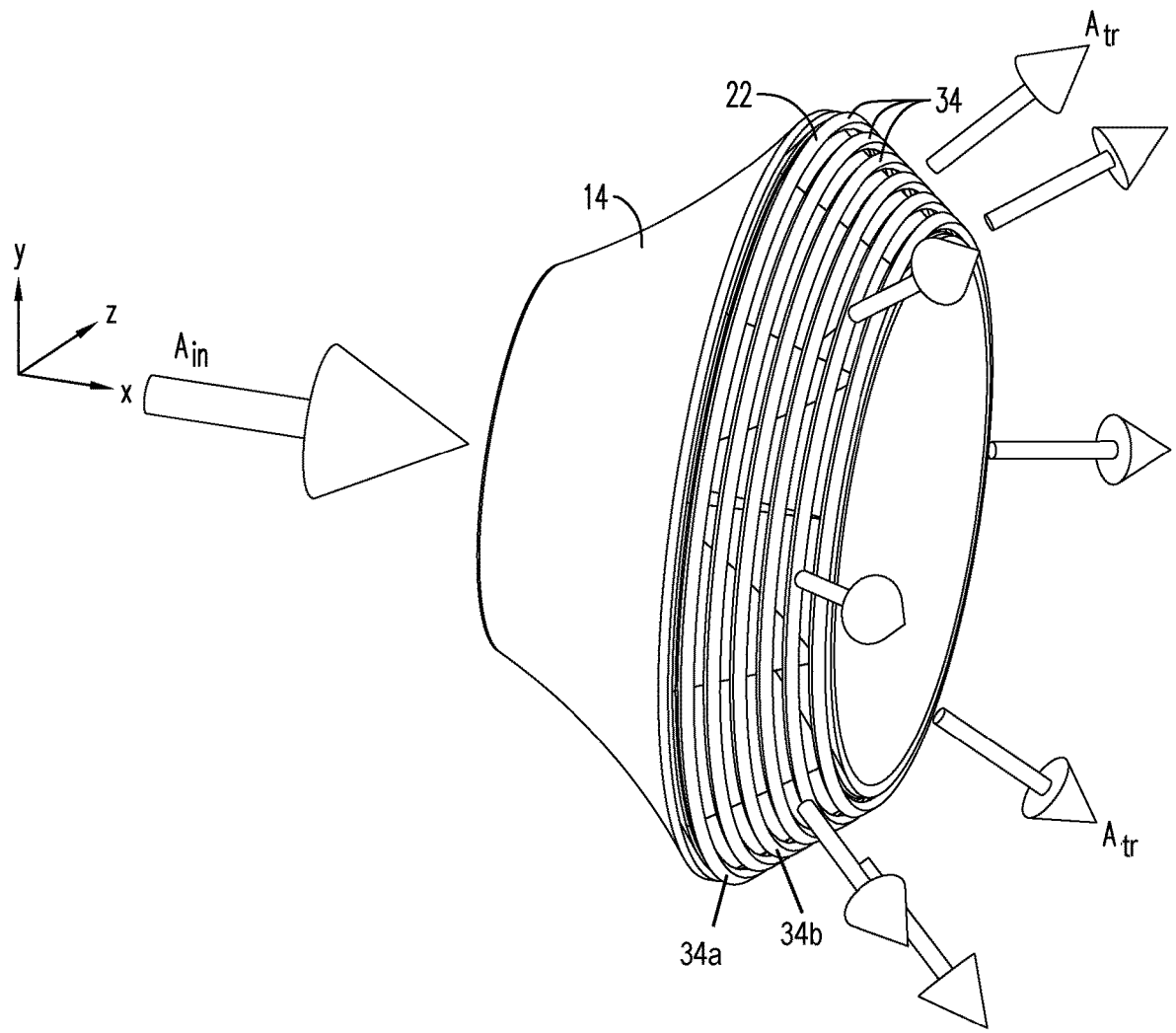
FIG. 9 is a schematic illustration of air flow through a fan and heat exchanger in the cooling system according to an exemplary embodiment of the disclosure.
Figure 10:
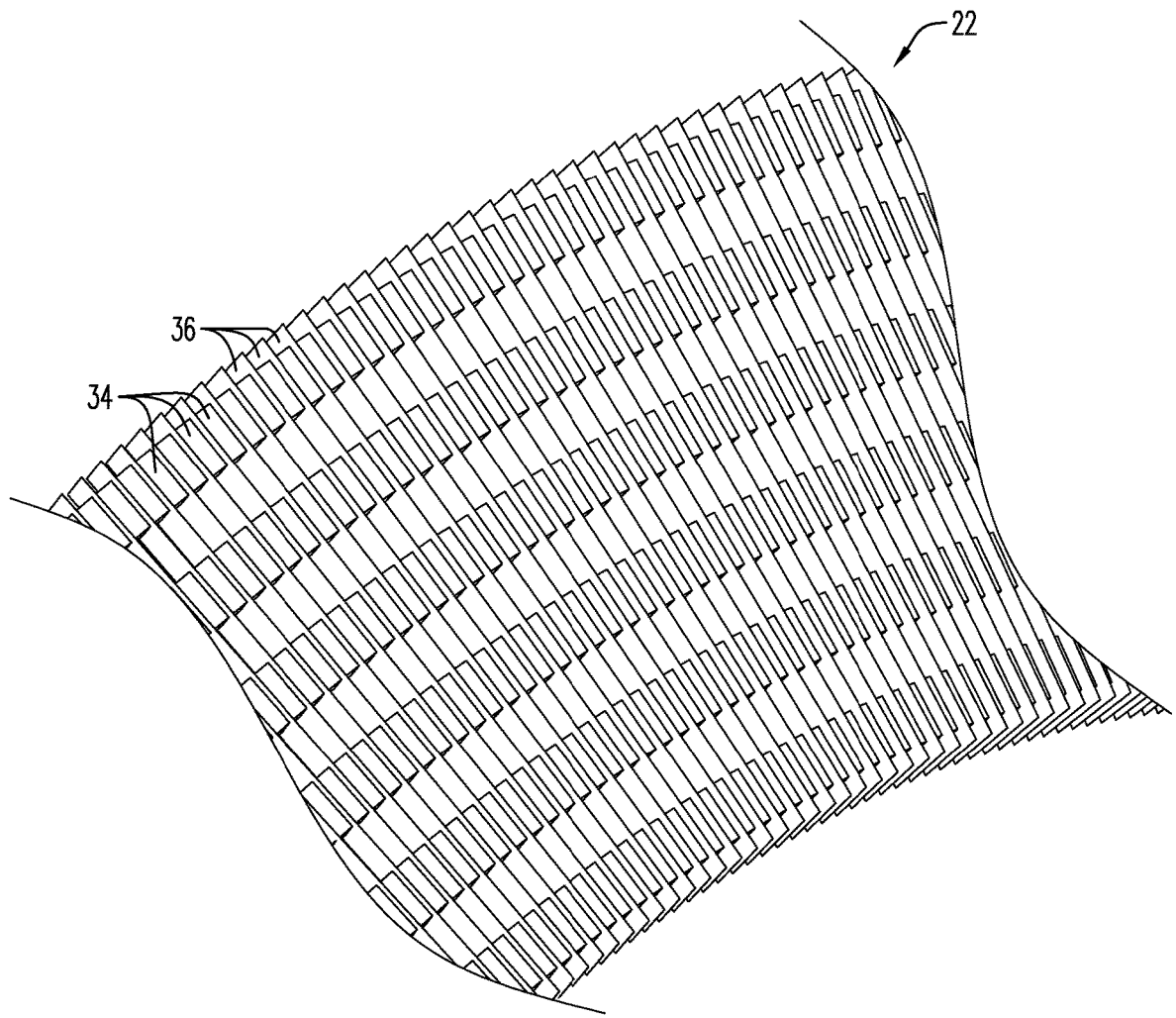
FIG. 10 is a fragmentary enlarged view of a portion of the heat exchanger in an exemplary embodiment of the cooling system disclosed herein.

The cooling air $A_{out}$, after passing through the fan rotor 14, flows through the conical shaped radiator or heat exchanger 22. With reference also to FIG. 9, the warmed air $A_{tr}$ exits the heat exchanger 22 and is further guided to be discharged from the cooling system 10, as discussed below. In the exemplary embodiment shown, the heat exchanger 22 includes a plurality of tubes 34 forming an annular or truncated cone that has a shape and configuration generally corresponding to that of the rear surface of the fan rotor 14. More particularly, the plurality of fan outlets 32 defined between adjacent blades 28 within the fan rotor 14 form an outlet surface area through which the cooling air flows exits the fan 14. The heat exchanger 22 has a corresponding shape and is disposed generally adjacent the plurality of fan outlets 32 such that substantially all the cooling air $A_{out}$ discharged from the fan 14 flows across the tubes 34 and fins forming the heat exchanger 22. The conical shape of the heat exchanger 22 may vary to have any desired angle, height, or dimension, that is, a tall cone, short cone, an acute angle, an open angle, or somewhere in between. Further, if the airflow $A_{out}$ from the fan rotor 14 is purely radial, with no axial component in the outlet airflow direction, then the heat exchanger 22 would be an annular cylinder in shape, rather than conical, since the included angle between the fan outlets 32 and the heat exchanger 22 would be 90 degrees. FIG. 10 shows an enlarged view of a portion of the heat exchanger 22 to illustrate the cooling tubes 34 and fins 36 (which are removed for clarity in the other views). The fins 36 may all be the same or there may be different fins between the tubes 34, i.e., different surface area, pitch, shape, orientation and the like. Similarly, the heat exchanger 22 is shown as a single layer of tubes 34 but one skilled in the art will appreciate that multiple layers of tubes defining multiple radiators can also be utilized as needed to obtain the desired cooling effectiveness.

In an exemplary embodiment of the heat exchanger 22, an annulus diameter outlined by the annular tubes 34 on one end thereof will of course be larger than an annulus diameter outlined by the annular tubes 34 on the other end thereof so as to define a cone shape of the heat exchanger 22. The annular tubes 34 forming each heat exchanger layer can vary in arrangement density and as well as inner/outer cross section diameter of the tubes themselves as used in each layer. The tubes 34 can also form a helix in which all the tubes are connected as one continuous tube, or alternatively, the tubes may be connected in a plurality of different circuits. That is, different tubes 34 can be used to cool different or the same systems of the vehicle which require cooling. For example, as shown in FIG. 9, a first cooling tube 34a, such as one or more of the largest annular tubes, can be configured for cooling a first system of the vehicle and a second cooling tube 34b, such as one or more of the smaller annular tubes, can be configured for cooling a second system of the vehicle. More particularly, the larger first cooling tube(s) 34a having the larger first annulus diameter can be configured for cooling a control unit in the vehicle while the smaller second cooling tube(s) 34b having the smaller second annular diameter can be configured for cooling a propulsion system in the vehicle (including systems such as hydraulic, motor, drive, and related control systems) or a condenser for an air conditioning system. Alternatively, the vehicle can be an electric vehicle and the larger first cooling tube(s) 34a can be configured for cooling electrical components of the electric vehicle while the smaller second cooling tube(s) 34b can be configured for cooling drive components in the vehicle. These are all merely examples and not limiting of how the heat exchanger 22 could be utilized in a vehicle.

Figure 6:
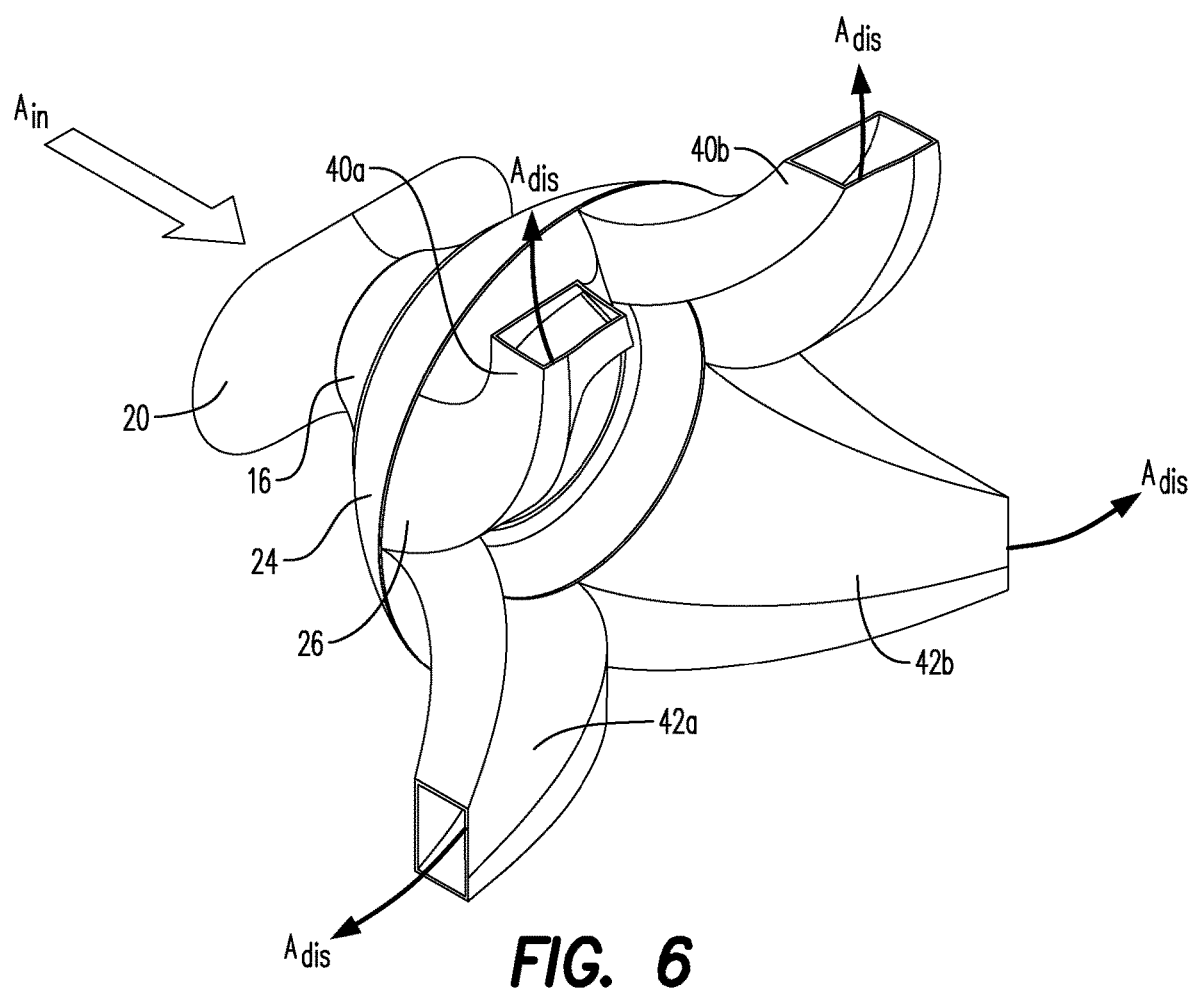
FIG. 6 is a rear perspective view of the cooling system shown in FIG. 3.
Figure 7:
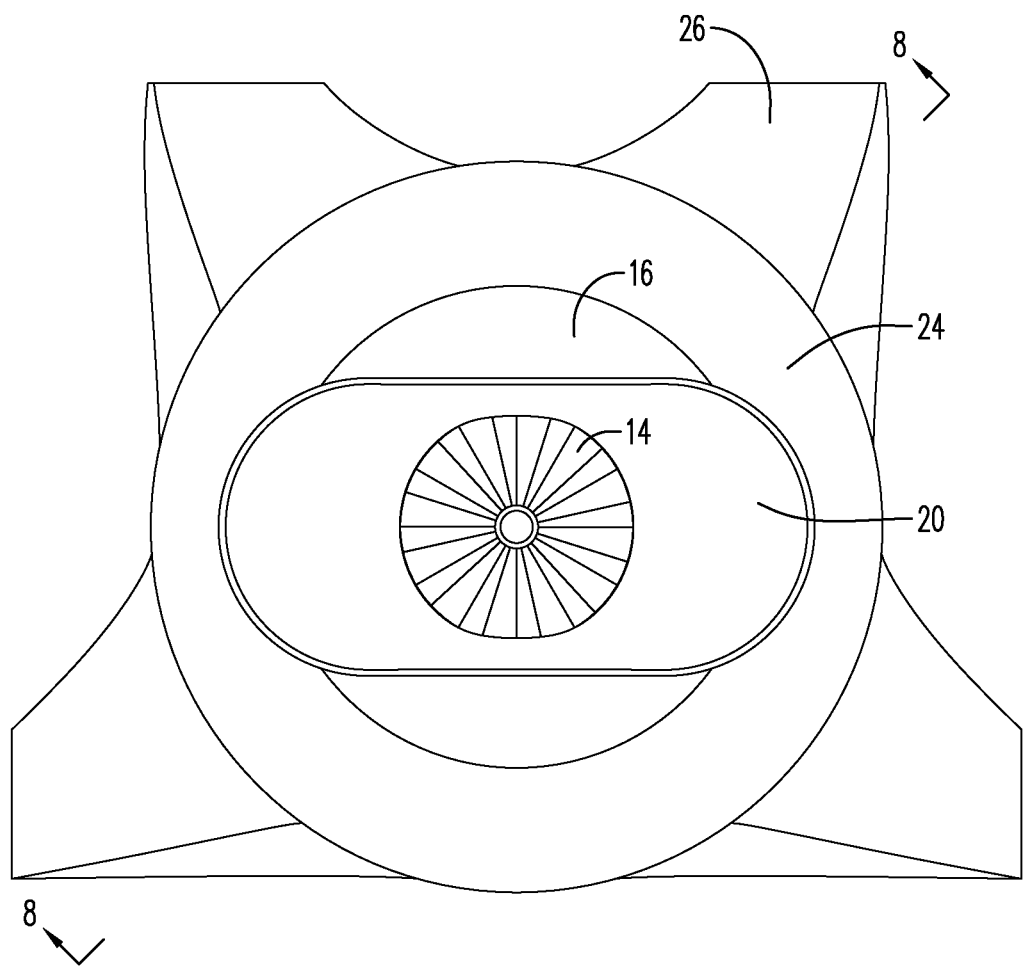
FIG. 7 is a front view of the cooling system shown in FIG. 3.
Figure 8:
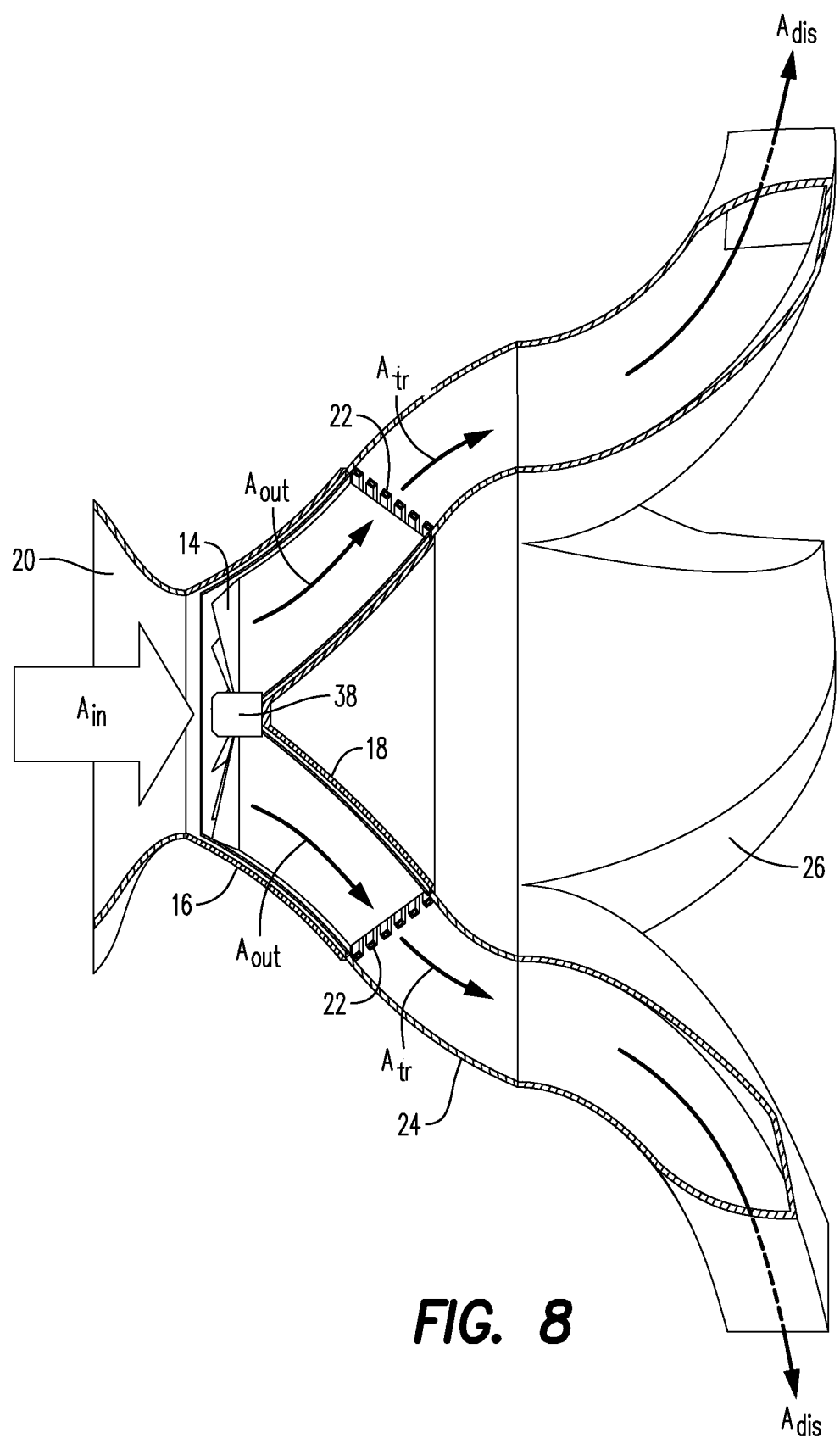
FIG. 8 is a cross-sectional view taken generally along the line 8-8 in FIG. 7.

Referring also to FIGS. 6-8, after passing through the heat exchanger 22 and heat being transferred thereto, the warmed air, $A_{tr}$, is guided by an outlet casing 24 to the discharge duct 26. The duct 26 in the exemplary embodiment defines an aero-thermal duct to discharge airflow $A_{dis}$ from the cooling system 10. Duct 26 can be integrated into the upper body or underbody airflow streams of the vehicle 10. By way of example, duct 26 may include outlet ducts 40a, 40b discharging a portion of airflow $A_{dis}$ into the upper body of the vehicle and outlet ducts 42a, 42b discharging a portion of airflow $A_{dis}$ into the underbody and/or wheel wells of the vehicle.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

I claim:

1. A cooling system for a vehicle comprising:
   a fan rotor having a leading side and a trailing side, a surface between the leading side and the trailing side defining a fan conical shape, the fan rotor including a plurality of fan blades; and
   a heat exchanger having a conical shape;
   wherein the fan rotor is configured to discharge air in a predetermined direction including an axial component and a radial component.

2. The cooling system according to claim 1, wherein the fan rotor defines a plurality of air inlets between adjacent said fan blades on a front surface of the fan rotor and a plurality of air outlets between adjacent said fan blades on a rear surface of the fan rotor.

3. The cooling system according to claim 2, wherein the plurality of air outlets define an annular conical surface, the conical shape of the heat exchanger generally corresponding to a configuration of the conical surface of the plurality of air outlets.

4. The cooling system according to claim 3, wherein the heat exchanger includes a plurality of cooling tubes.

5. The cooling system according to claim 4, wherein the plurality of cooling tubes includes at least one first cooling tube having a first annulus diameter and at least one second cooling tube having a second annulus diameter, the first annulus diameter being different from the second annulus diameter.

6. The cooling system according to claim 4, wherein the plurality of cooling tubes define a first layer of cooling tubes, and further comprising a second layer of cooling tubes.

7. The cooling system according to claim 4, wherein the heat exchanger further includes a plurality of fins extending between the plurality of cooling tubes.

8. The cooling system according to claim 1, further comprising an air guide inlet configured to guide air into a front surface of the fan rotor in an axial direction.

9. The cooling system according to claim 1, further comprising a conical outer fan rotor casing disposed over a front surface of the fan rotor and a conical inner fan rotor casing disposed within a conical cavity on a rear surface of the fan rotor.

10. The cooling system according to claim 9, further comprising an outlet casing configured to guide air flowing through the fan rotor.

11. The cooling system according to claim 10, further comprising an aero thermal duct configured to discharge air passing through the outlet casing into at least one of an upper body air flow stream and an underbody air flow.

12. A vehicle cooling system comprising:
   a fan rotor including a plurality of fan blades; and
   a heat exchanger having a cylindrical shape;
   wherein the fan rotor is configured to discharge air in only a radial direction;
   wherein the fan rotor defines a plurality of air inlets between adjacent said fan blades on a front surface of the fan rotor and a plurality of air outlets between adjacent said fan blades on a rear surface of the fan rotor; and
   wherein the plurality of air outlets define an annular surface, the cylindrical shape of the heat exchanger generally corresponding to a configuration of the annular surface of the plurality of air outlets.

13. The cooling system according to claim 12, further comprising an air inlet configured to guide air into a front surface of the fan rotor in an axial direction generally parallel to an axis of the fan rotor.

14. A cooling system for a vehicle configured to cool a plurality of systems in a vehicle, the cooling system comprising:
   a conical shaped heat exchanger including a plurality of annular cooling tubes;
   wherein the plurality of annular cooling tubes includes at least one first cooling tube having a first annulus diameter and at least one second cooling tube having a second annulus diameter, the first annulus diameter being larger than the second annulus diameter;
   wherein the at least one first cooling tube is configured for cooling a first system of the vehicle and the at least one second cooling tube is configured for cooling a second system of the vehicle, the first vehicle system being different from the second vehicle system.

15. The cooling system according to claim 14, wherein the at least one first cooling tube is configured for cooling at least one control unit in the vehicle.

16. The cooling system according to claim 15, wherein the at least one second cooling tube is configured for cooling at least one propulsion system in the vehicle.

17. The cooling system according to claim 15, wherein the at least one second cooling tube is configured for cooling a condenser for an air conditioning system.

18. The cooling system according to claim 14, wherein the vehicle is an electric vehicle and the at least one first cooling tube is configured for cooling electrical components of the electric vehicle.

* * * * *